United States Patent Office 2,830,348
Patented Apr. 15, 1958

2,830,348

REFRACTORY MATERIALS

Terence Stanley Busby, London, Maurice Manners, Whitley Bay, and John Henry Partridge, Pinner, England, assignors to The General Electric Company Limited, London, England No Drawing. Application March 4, 1952
Serial No. 274,828

Claims priority, application Great Britain March 5, 1951

10 Claims. (Cl. 25—156)

This invention relates to refractory materials, and more particularly, though not exclusively, to coherent bodies of refractory materials suitable for use in the form of blocks for the construction of tank furnaces for glass manufacture. The invention also relates to methods of manufacturing such coherent bodies.

An important requirement of the refractory blocks of which tank furnaces used for glass manufacture are constructed is that they shall resist the corrosive attack of the molten glass, and of the mixture of raw materials for making the glass, which are contained in the tank during the glass manufacturing process. Furthermore, low porosity is a very desirable property of the blocks, in order to reduce to a minimum disintegration of the blocks due to penetration of corrosive agents beneath the surface of the blocks. A further requirement of the tank furnace blocks is that they shall withstand, without marked deformation, the high temperatures to which they are heated during the manufacture of the glass.

These refractory tank furnace blocks are usually made from materials which are predominantly composed of aluminium silicates, such as clay or sillimanite, the blocks being formed by moulding the raw materials to the desired shape and then baking to a high temperature such that the clay or other silico-aluminous material initially present is dehydrated and is converted mainly into mullite, a crystalline silico-aluminous substance of the composition $3Al_2O_3.2SiO_2$, with the liberation of silica. The refractory blocks thus produced are therefore composed essentially of mullite crystals bonded together with a vitreous matrix, the proportion of vitreous matrix present being determined partly by the amounts of impurities initially present in the raw material and partly by the amount of free silica present in the vitreous state as a result of the firing of the moulded blocks. The vitreous matrix may form about 50% of the material of the blocks made in this way, or an even higher proportion.

At the high temperatures to which tank furnace blocks are subjected during the manufacture of glass in the furnace, the vitreous matrix of the refractory blocks made as described above is of sufficiently low viscosity to be capable of flowing and hence, in the proportions usually present, of giving rise to deformation of the blocks. Also the vitreous matrix is more readily attacked by the molten glass or constituents thereof than is the crystalline mullite constituent of the blocks.

It is known to manufacture tank furnace blocks having a higher mullite content and therefore a lower proportion of vitreous matrix than those described above by the method of fusion casting, that is to say by fusing the raw materials, comprising clay and alumina, for example in an electric furnace, and casting the molten material in a mould. It has also been proposed to incorporate zirconia (zirconium oxide) in the silico-aluminous tank blocks made by fusion casting.

It has further been proposed to employ blocks made from a mixture of zircon (zirconium silicate) and zirconia for the construction of furnaces used for melting special glasses at very high temperatures, of the order of 2000° C. Such blocks, however, are very porous and are attacked by glasses of the soda-lime and other common types.

It is an object of the present invention to provide a coherent body of refractory material of novel composition and of low porosity, which can be obtained in the form of blocks very suitable for use in the construction of tank furnaces for glass manufacture. Another object of the invention is to provide methods of manufacturing such materials and blocks by a heating process not involving fusion of all the starting materials.

According to the invention a coherent body of refractory material consists substantially of crystals of mullite, crystals of zircon, crystals of zirconia, and a siliceous vitreous bonding medium with which the said crystals are bonded together, the proportions of zircon and zirconia present in the body being such that the total content of zirconium dioxide, $ZrO_2$, in the body, whether in the free state or combined with silica, is between 27% and 54% by weight of the body, and the proportion of vitreous bonding medium being less than 20% by weight of the body.

We have found that the presence of zirconia, in addition to zircon and mullite, in refractory bodies in accordance with the invention confers advantageous properties with regard to rigidity and/or resistance to corrosion at high temperatures.

In manufacturing a coherent body of refractory material according to the invention, the mullite may conveniently be produced in situ by heating clay or some other suitable silico-aluminous material. The preferred silico-aluminous material is substantially pure china clay, which contains a lower proportion of free silica and other mineral impurities, and thus a higher proportion of the essential constituent aluminium silicate,

$$Al_2O_3.2SiO_2.2H_2O$$

than is the case with other clay materials, and which therefore on heating gives a product containing a higher proportion of mullite crystals and a lower proportion of vitreous bonding medium. Moreover the vitreous matrix formed on the decomposition of china clay is more viscous than that produced by the decomposition of other clays containing a greater proportion of impurities. Hence the use of china clay is of assistance in obtaining a product of good rigidity at high temperatures.

For the manufacture of a refractory body in accordance with the invention, clay is heated with zircon: on heating, zircon tends to decompose partially to form zirconia and silica, the extent to which this decomposition takes place increasing with increasing firing temperatures. The maximum firing temperature which can be employed will usually be limited by the fact that at excessively high temperatures, when a relatively large proportion of molten material is present in the body being fired, the body becomes "bloated," that is to say holes are formed in the material of the body, due to the relatively high pressure of vapour present. The presence of such holes will usually be undesirable, especially when the refractory bodies are tank blocks for use in the construction of glass melting furnaces, since they will increase the rate of corrosion of the block by molten glass.

Some uncombined alumina may be added to the mixture of clay and zircon before heating: this free alumina will tend to combine with silica liberated on decomposition of the clay during the heating, to form mullite, so that the proportion of mullite formed during the heating of the mixture is increased and the proportion of vitreous bonding medium reduced. In this case, therefore, the rigidity at high temperatures and resistance to corrosion of the product are in general greater than is the case with materials made from clay and zircon only.

In one method of manufacturing a coherent body of refractory material according to the invention, a mixture having a composition within the range of 40% to 80% zircon, 20% to 60% china clay, and 0 to 40% uncombined alumina, all proportions being by weight, is heated at a temperature of at least 1500° C. and sufficiently high to ensure that the product contains some free zirconia but below the temperature at which bloating of the refractory body occurs, the duration of the heating at the specified temperature being at least 3 hours and being such as to produce a coherent refractory body of the composition referred to above. Preferably the heating is carried out at a temperature within the range of 1500° C. to 1650° C., the actual firing temperature which is most suitable depending upon the composition of the mixture fired and also, for any given composition, varying somewhat according to the thickness of the body being fired and the duration of the firing. Thus small bodies, which are heated up to the maximum firing temperature relatively quickly and maintained at this temperature for only a few hours require higher maximum firing temperatures than are necessary, for obtaining products of similar properties, in the case of bodies of the same composition but of greater thickness which are raised to the maximum firing temperature more slowly and maintained at this temperature for a longer period, say one or two days.

In a preferred method of manufacturing refractory bodies according to the invention, at least 10% of free or uncombined alumina, preferably in a calcined form, is included in the initial mixture, the proportion of uncombined alumina in the mixture not exceeding 40% by weight. Thus in this preferred method the mixture heated will consist of zircon, china clay and alumina in proportions within the ranges of 40% to 70% zircon, 20% to 40% china clay, and 10% to 40% uncombined alumina. If free alumina is included in the mixture of starting materials, the heating is preferably carried out at a temperature sufficiently high to ensure that no free alumina is present in the final product, substantially all the alumina being combined with free silica, which is formed on decomposition of the clay on heating, to form mullite.

We have found that the inclusion of free alumina in the initial mixture tends to promote the decomposition of the zircon to form zirconia and silica, and that this effect is more pronounced the higher the firing temperature. Any excess alumina tends to combine with the silica thus liberated, in addition to that liberated by decomposition of the clay, to form mullite, and absorption of excess alumina in this way also occurs more readily at higher temperatures. For example, in the cases of two small refractory blocks, two inches in thickness, made by heating a mixture having the composition 50% zircon, 20% china clay and 30% free alumina, for three hours, at 1550° C. and 1620° C. respectively, the blocks being heated and cooled rapidly so that the whole firing operation took only about 36 hours, it was found that the block fired at 1550° C. contained in addition to mullite, a relatively high proportion of zircon, a lower proportion of zirconia, and a small proportion of free alumina, while the block fired at 1620° C. contained only a very small proportion of zircon, nearly all the zircon having been decomposed to give zirconia and silica, but contained no free alumina.

The refractory bodies according to the invention can be obtained with considerably lower porosity than the blocks hitherto made from zircon and zirconia for the construction of furnaces used for melting glass at very high temperatures, referred to above, since the mullite and the vitreous bonding medium present serve to bond the crystals of zircon and zirconia together, the mullite crystals growing in the vitreous bonding medium and filling the interstices between the zircon and zirconia crystals. Thus by increasing the proportion of mullite in the bonding medium by the addition of uncombined alumina to the initial mixture, a refractory body which is substantially non-porous as well as being relatively rigid and resistant to corrosion at high temperatures, such as the operating temperatures of a glass tank furnace, is obtained. However, we have found that in the manufacture of tank blocks for glass melting furnaces, in order to ensure that a product of the optimum low porosity is obtained, certain limitations with regard to the compositions of the starting mixtures and the firing temperatures are desirable: thus the porosity of the product is lower, the lower the free alumina content of the initial mixture, and the porosity also decreases with increasing firing temperature. Hence as the firing temperature is increased the proportion of uncombined alumina which can be included in the initial mixture without resulting in a product of undesirably high porosity is also increased. A relatively high initial alumina content is desirable since an additional limitation becomes operative at firing temperatures of about 1550° C. and above, in that compositions initially containing less than 10% of uncombined alumina tend to become bloated at these temperatures; accordingly, in order that a composition may be fired at a sufficiently high temperature to ensure that some free zirconia is present in the product, without the risk of bloating, it is desirable to include at least 10% of free alumina in the initial composition. For example, refractory bodies free from bloating and having sufficiently low porosities to render them very suitable for use for glass furnace tank blocks can be produced from mixtures having compositions within the range of 40% to 70% zircon, 20% to 40% china clay and 10% to 30% uncombined alumina, blocks having apparent volume porosities not greater than 25% being obtained by firing such mixtures at temperatures within the range of 1550° C. to 1620° C., the actual temperature used depending on the thickness of the blocks and the duration of the firing, as aforesaid.

Preferably, in order to obviate practical difficulties which may arise in manufacturing and transporting blocks made from compositions of very high zircon content, the proportion of zircon included in the initial mixture is not greater than 70%.

The zircon used should be in a finely ground form, preferably consisting entirely of particles capable of passing through a sieve having 200 meshes to the linear inch.

For imparting a desired shape to the coherent body of the invention, the mixture of raw materials may be moulded to the required shape before heating.

The preferred method of manufacturing coherent refractory bodies according to the invention, for example in the form of blocks suitable for the construction of tank furnaces for glass manufacture, comprises the steps of mixing powdered zircon, china clay and, preferably, calcined alumina, in the required proportions, with water containing a small proportion of one or more suitable deflocculating agents such as sodium silicate and sodium carbonate, to produce a slurry, forming this slurry into the required shape, drying, and firing at a suitable temperature above 1500° C. For forming the blocks the method of slip casting may conveniently be used; thus the aqueous slurry of the raw materials is poured into a plaster mould, and when the outside of the cast block has dried the mould is stripped off, and the block is allowed to harden throughout and is then fired at the appropriate temperature.

One method of manufacturing blocks of a refractory composition according to the invention, for use in the construction of glass tank furnaces, will now be described by way of example.

In this method, a mixture is prepared consisting of powdered zircon, china clay, and preferably calcined alumina, in the required proportions within the ranges hereinbefore specified, and this material is mixed with sufficient water to form a thick slurry, the water also containing, as deflocculating agents, sodium silicate and sodium carbonate in the proportions of 0.4% and 0.1% respectively by weight of the weight of clay. The slurry is poured into suitably shaped plaster of Paris moulds, and when the outsides of the moulded blocks have hardened the moulds are stripped off. The blocks are then allowed to stand at room temperature for a sufficient time to ensure that the interiors of the blocks have dried off and hardened. The blocks are then heated slowly in a furnace to a suitable temperature between 1500° C. and 1650° C. and are maintained at this temperature for periods up to two days, the actual length of time depending on the size of the blocks being fired.

Some specific examples of small refractory blocks manufactured by this method are listed in Table I, in which are shown, for each block, the composition of the starting mixture, the maximum firing temperature, and the porosity of the product measured as the apparent volume porosity, that is to say the ratio of the volume of the open pores which can be penetrated by a liquid from the exterior of the block to the total volume of the block, expressed as a percentage.

Table I

| | Composition of starting mixture, percent by weight | | | Maximum firing temp., °C. | Porosity of product, percent |
|---|---|---|---|---|---|
| | Zircon | China clay | Calcined alumina | | |
| 1 | 40 | 60 | 0 | 1,620 | 0.39 |
| 2 | 70 | 30 | 0 | 1,620 | 3.34 |
| 3 | 80 | 20 | 0 | 1,620 | 2.90 |
| 4 | 50 | 40 | 10 | 1,620 | 1.87 |
| 5 | 50 | 30 | 20 | 1,620 | 22.9 |
| 6 | 60 | 30 | 10 | 1,620 | 0.84 |
| 7 | 60 | 20 | 20 | 1,620 | 4.50 |
| 8 | 70 | 20 | 10 | 1,620 | 3.47 |

The blocks referred to in Table I were in the form of cubes of size 2 inches long, and owing to their small size were heated up to the maximum firing temperature relatively rapidly, the whole firing operation occupying only about 36 hours, and were maintained at the maximum firing temperature for only 3 hours. The maximum firing temperature was therefore about 50° C. higher than would have been necessary for the manufacture of larger blocks fired for an adequate length of time.

As an example of the manufacture of larger blocks, a block 6 to 8 inches thick, produced by the method of slip casting described above by way of example, is raised to a temperature of 1500° C. at the rate of 100° C. every 24 hours, is then raised from 1500° C. to 1550° C. in 24 hours, and is maintained at this temperature for 24 to 48 hours, is then cooled from 1550° C. to 1450° C. in 24 hours, and is finally allowed to cool to the ordinary temperature, the whole firing operation taking 21 days. Table II shows the composition of the starting mixture, the maximum firing temperature, and the porosity (apparent volume porosity) of some blocks manufactured under these conditions.

Table II

| | Composition of starting mixture, percent by weight | | | Maximum firing temp., °C. | Porosity of product, percent |
|---|---|---|---|---|---|
| | Zircon | China clay | Calcined alumina | | |
| 9 | 60 | 30 | 10 | 1,550 | 1.4 |
| 10 | 50 | 30 | 20 | 1,550 | 15.8 |
| 11 | 50 | 40 | 10 | 1,550 | 0.7 |
| 12 | 40 | 30 | 30 | 1,550 | 22.1 |

The blocks referred to in Tables I and II all consist of a coherent refractory material which is highly resistant to attack by molten glass, and are all composed of crystals of mullite, zircon, and zirconia, bonded together by a vitreous silico-aluminous matrix, blocks 4, 7, 11 and 12 containing a preponderance of zirconia and blocks 1, 2, 3, 5, 8 and 10 containing a preponderance of zircon, while in blocks 6 and 9 these two compounds are present in approximately equal proportions. None of the blocks contains any free alumina. Blocks 1, 2 and 3 showed a tendency to bloat, and therefore were not so suitable for use as tank blocks as the remainder of the blocks referred to in the tables.

We claim:

1. A coherent body of refractory material consisting essentially of crystals of mullite, crystals of zircon and crystals of zirconia, and a vitreous bonding medium consisting essentially of silica bonding together the crystals of zircon and zirconia, the mullite crystals being in the vitreous bonding medium and filling the interstices between the crystals of zircon and zirconia, the proportions of zircon and zirconia present in the body being such that the total content of zirconium dioxide, $ZrO_2$, in the body, both in the free state and combined with silica, is between 27% and 54% by weight of the body, and the proportion of vitreous bonding medium being less than 20% by weight of the body.

2. A method of manufacturing a coherent body of refractory material consisting essentially of crystals of mullite, crystals of zircon and crystals of zirconia, and a vitreous bonding medium consisting essentially of silica bonding together the crystals of zircon and zirconia, the mullite crystals being in the vitreous bonding medium and filling the interstices between the crystals of zircon and zirconia, which method comprises the steps of preparing a mixture consisting essentially of 40% to 80% finely ground zircon, 20% to 60% substantially pure china clay, and 0 to 40% uncombined alumina by weight, moulding the said mixture to a desired shape, and heating the said mixture for a period of at least 3 hours at a temperature within the range of 1500° C. to 1650° C. such that some free zirconia is present in the product and all the alumina is combined with silica in the form of mullite.

3. A method of manufacturing a refractory tank block for the wall of a tank furnace for glass manufacture consisting essentially of crystals of mullite, crystals of zircon and crystals of zirconia, and a vitreous bonding medium consisting essentially of silica bonding together the crystals of zircon and zirconia, the mullite crystals being in the vitreous bonding medium and filling the interstices between the crystals of zircon and zirconia, which method comprises the steps of preparing a mixture consisting essentially of 40% to 70% finely ground zircon, 20% to 40% substantially pure china clay, and 10% to 40% uncombined alumina, by weight, moulding the said mixture to a desired shape, and heating the said mixture for at least 3 hours at a temperature within the range of 1500° C. to 1650° C. such that some free zirconia is present in the product and all the alumina is combined with silica in the form of mullite.

4. A method according to claim 3 which comprises the steps of preparing a mixture of substantially pure china clay, powdered zircon consisting entirely of particles capable of passing through a sieve having 200 meshes to the linear inch, and calcined alumina, forming said mixture into a slurry with water containing a deflocculating agent, casting the said slurry in a plaster mould, drying the outside of the casting, stripping the mould off the casting, allowing the casting to harden throughout, and heating the casting for at least 3 hours at a temperature within the range of 1500° C. to 1650° C.

5. A method of manufacturing a refractory tank block for the wall of a tank furnace for glass manufacture consisting essentially of crystals of mullite, crystals of zircon and crystals of zirconia, and a vitreous bonding medium consisting essentially of silica bonding together the crystals of zircon and zirconia, the mullite crystals being in the vitreous bonding medium and filling the interstices between the crystals of zircon and zirconia, which method comprises the steps of preparing a mixture consisting essentially of 40% to 70% finely ground zircon, 20% to 40% substantially pure china clay, and 10% to 30% uncombined alumina, by weight, moulding the said mixture for a period within the range of 3 hours to 48 hours, at a temperature within the range of 1550° C. to 1620° C. such that some free zirconia is present in the product, the temperature and duration of the heating being such that all the alumina is combined with silica in the form of mullite.

6. A refractory block for use in the construction of a tank furnace for glass manufacture, having an apparent volume porosity not greater than 25% and consisting essentially of crystals of mullite, crystals of zircon and crystals of zirconia, and a vitreous bonding medium consisting essentially of silica bonding together the crystals of zircon and zirconia, the mullite crystals being in the vitreous bonding medium and filling the interstices between the crystals of zircon and zirconia, the proportions of zircon and zirconia present in the block being such that the total content of zirconium dioxide, $ZrO_2$, in the body, both in the free state and combined with silica, is between 27% and 54% by weight of the body, and the proportion of vitreous bonding medium being less than 20% by weight of the body.

7. A method of manufacturing a refractory block for use in the construction of a tank furnace for glass manufacture which comprises the steps of preparing a mixture consisting essentially of 60% powdered zircon composed entirely of particles capable of passing through a sieve having 200 meshes to the linear inch, 30% substantially pure china clay, and 10% calcined alumina, forming said mixture into a slurry with water containing sodium silicate and sodium carbonate in the proportions of 0.4% and 0.1% respectively by weight of the weight of clay, casting the said slurry in a plaster mould in the shape of blocks 8 inches in thickness, drying the outside of the cast block, stripping the mould off the block, allowing the block to harden throughout, and firing the block by the steps of raising its temperature to 1500° C. at the rate of 100° every 24 hours, raising the temperature from 1500° C. to 1550° C. in 24 hours, maintaining the block at 1550° C. for 24 to 48 hours, cooling the block from 1550° C. to 1450° C. in 24 hours, and finally allowing the block to cool to the ordinary temperature, the whole firing operation taking 21 days.

8. A method of manufacturing a refractory block for use in the construction of a tank furnace for glass manufacture which comprises the steps of preparing a mixture consisting essentially of 50% powdered zircon composed entirely of particles capable of passing through a sieve having 200 meshes to the linear inch, 30% substantially pure china clay, and 20% calcined alumina, forming said mixture into a slurry with water containing sodium silicate and sodium carbonate in the proportions of 0.4% and 0.1% respectively by weight of the weight of clay, casting the said slurry in a plaster mould in the shape of blocks 8 inches in thickness, drying the outside of the cast block, stripping the mould off the block, allowing the block to harden throughout, and firing the block by the steps of raising its temperature to 1500° C. at the rate of 100° every 24 hours, raising the temperature from 1500° C. to 1550° C. in 24 hours, maintaining the block at 1550° C. for 24 to 48 hours, cooling the block from 1550° C. to 1450° C. in 24 hours, and finally allowing the block to cool to the ordinary temperature, the whole firing operation taking 21 days.

9. A method of manufacturing a refractory block for use in the construction of a tank furnace for glass manufacture which comprises the steps of preparing a mixture consisting essentially of 50% powdered zircon composed entirely of particles capable of passing through a sieve having 200 meshes to the linear inch, 40% substantially pure china clay, and 10% calcined alumina, forming said mixture into a slurry with water containing sodium silicate and sodium carbonate in the proportions of 0.4% and 0.1% respectively by weight of the weight of clay, casting the said slurry in a plaster mould in the shape of blocks 8 inches in thickness, drying the outside of the cast block, stripping the mould off the block, allowing the block to harden throughout, and firing the block by the steps of raising its temperature to 1500° C. at the rate of 100° every 24 hours, raising the temperature from 1500° C. to 1550° C. in 24 hours, maintaining the block at 1550° C. for 24 to 48 hours, cooling the block from 1550° C. to 1450° C. in 24 hours, and finely allowing the block to cool to the ordinary temperature, the whole firing operation taking 21 days.

10. A method of manufacturing a refractory block for use in the construction of a tank furnace for glass manufacture which comprises the steps of preparing a mixture consisting essentially of 40% powdered zircon composed entirely of particles capable of passing through a sieve having 200 meshes to the linear inch, 30% substantially pure china clay, and 30% calcined alumina, forming said mixture into a slurry with water containing sodium carbonate in the proportions of 0.4% and 0.1% respectively by weight of the weight of clay, casting the said slurry in a plaster mould in the shape of blocks 8 inches in thickness, drying the outside of the cast block, stripping the mould off the block, allowing the block to harden throughout, and firing the block by the steps of raising its temperature to 1500° C. at the rate of 100° every 24 hours, raising the temperature from 1500° C. to 1550° C. in 24 hours, maintaining the block at 1550° C. for 24 to 48 hours, cooling the block from 1550° C. to 1450° C. in 24 hours, and finally allowing the block to cool to the ordinary temperature, the whole firing operation taking 21 days.

References Cited in the file of this patent

UNITED STATES PATENTS

| | | |
|---|---|---|
| 1,375,077 | Buckman et al. | Apr. 19, 1921 |
| 1,412,016 | Buckman et al. | Apr. 18, 1922 |
| 1,440,657 | Buckman et al. | Jan. 2, 1923 |
| 1,615,751 | Fulcher | Jan. 25, 1927 |
| 1,682,251 | Riddle | Aug. 28, 1928 |
| 1,811,242 | Morgan et al. | June 23, 1931 |
| 1,816,006 | Easter | July 28, 1931 |
| 1,862,191 | Meth | June 7, 1932 |
| 2,271,366 | Field | Jan. 27, 1942 |
| 2,303,304 | Schleicher et al. | Nov. 24, 1942 |
| 2,335,325 | Wainer | Nov. 30, 1943 |

FOREIGN PATENTS

| | | |
|---|---|---|
| 396,532 | Great Britain | Aug. 10, 1933 |
| 610,334 | Great Britain | Oct. 18, 1948 |

OTHER REFERENCES

Bowen et al.: "The System: $Al_2O_3$-$SiO_2$," Journal American Ceramic Society, vol. 7, No. 4 (1924), page 242.